United States Patent [19]

Mishra et al.

[11] Patent Number: 4,908,421

[45] Date of Patent: Mar. 13, 1990

[54] PRODUCTION OF TERMINALLY FUNCTIONAL POLYMER BY CATIONIC POLYMERIZATION

[75] Inventors: Munmaya K. Mishra, Akron, Ohio; Akhtar Osman, Clearwater, Canada

[73] Assignee: Polysar Limited, Sarnia, Canada

[21] Appl. No.: 224,370

[22] Filed: Jul. 26, 1988

[51] Int. Cl.$^4$ .......................... C08F 4/14; C08F 4/34; C08F 10/10

[52] U.S. Cl. ..................... 526/147; 526/135; 526/219; 526/221; 526/227; 526/230; 526/230.5; 526/232; 526/232.3; 526/237; 526/347; 526/339; 526/348.7; 526/88; 502/160

[58] Field of Search ............... 526/135, 147, 192, 219, 526/221, 227, 230, 230.5, 232, 237, 348.7, 339, 88, 232.3, 347; 502/160

[56] References Cited

U.S. PATENT DOCUMENTS

| | | | |
|---|---|---|---|
| 3,629,215 | 12/1971 | Nakaguchi et al. | 526/227 X |
| 3,959,225 | 5/1976 | Kuntz | 526/237 X |
| 4,276,394 | 6/1981 | Kennedy et al. | 526/348.7 X |
| 4,316,973 | 2/1982 | Kennedy | 526/348.7 X |
| 4,342,849 | 8/1982 | Kennedy | 526/348.7 X |
| 4,524,188 | 6/1985 | Kennedy et al. | 526/348.7 X |

FOREIGN PATENT DOCUMENTS 0206756 12/1986 European Pat. Off. ............ 526/237

*Primary Examiner*—Joseph L. Schofer
*Assistant Examiner*—F. M. Teskin
*Attorney, Agent, or Firm*—Stevens, Davis, Miller & Mosher

[57] ABSTRACT

A polymerization process is provided for producing a terminally functional polymer which comprises introducing a monomer charge, a Lewis acid and an organic peroxy compound into a suitable reaction vessel and polymerizing the monomer charge at a temperature of from about 0° to about −80° C. to form the terminally functional polymer, wherein the monomer charge comprises isobutylene and the organic peroxy compound is charge in an amount of from about $10^{-4}$ to about $10^{-1}$ moles per mole of the isobutylene. In a preferred embodiment, the monomer charge additionally comprises vinylidene aromatic or diolefin monomers. The invention also provides a novel catalyst system comprising an organic peroxy compound and a Lewis acid for the polymerization of isobutylene or monomer mixtures containing isobutylene.

22 Claims, No Drawings

PRODUCTION OF TERMINALLY FUNCTIONAL POLYMER BY CATIONIC POLYMERIZATION

FIELD OF THE INVENTION

The present invention relates to a polymerization process for producing a terminally functional polymer. Further, the present invention relates to a novel catalyst system for the polymerization of isobutylene or a mixture of monomers containing isobutylene.

BACKGROUND OF THE INVENTION

Terminally functional polymers are of great interest in that they may serve as precursors to the production of graft or block copolymers. Graft or block copolymers are of interest because they represent a way in which two different and incompatible polymers segments may be compatibilized. Thus, it would be advantageous to develop a process whereby a terminally functional polymer may be simply produced.

DESCRIPTION OF THE PRIOR ART

Kennedy has developed a series of initiator-transfer agents, "inifers", to be used as initiators for the synthesis of terminally functional, "telechelic", polymers of isobutylene. The "inifer" is capable of (i) participating in initiation during the polymerization reaction, and (ii) participating in the process of chain transfer to the "inifer". Thus, the "inifer" when used in conjunction with a Lewis acid can be used to conduct carbocationic polymerization of isobutylene to produce a terminally functional polymer. Kennedy's preferred group of "inifer" appears to be $AY_n$, wherein: A is an aryl moiety, Y is —$C(CH_3)_2Cl$ and n is an integer of from 1 to 4. The "telechelic" polymers produced by using the "inifer" retain the group A terminally (in the case of n=1) or within the polymer backbone (in the case of n=2, 3 or 4) and the tertiary chlorine group terminally. For a more detailed discussion of these "inifers", see U.S. Pat. Nos. 4,276,394 and 4,524,188.

The tertiary chlorine ended "telechelic" polymers described above may be used as precursors for the synthesis of a variety of functionalities at the polymer termini. For a more detailed discussion of these polymers and their production, see U.S. Pat. Nos. 4,316,973 and 4,342,849.

Kennedy further discloses in published European Patent Application 206,756 that a "living" catalyst system comprising an organic acid (or its ester) and Lewis acid may suitably be used to produce a polymer of isobutylene (or a copolymer of isobutylene and isoprene) having functional end groups.

SUMMARY OF THE INVENTION

It is an objective of the present invention to provide a process for producing a terminally functional polymer.

It is another objective of the present invention to provide a novel catalyst system for use in producing a terminally functional polymer.

Accordingly, in one of its aspects, the present invention provides a living cationic polymerization process for producing a terminally functional polymer which comprises introducing a monomer charge, a Lewis acid and an organic peroxy compound into a suitable reaction vessel and polymerizing the monomer charge at a temperature of from about 0° to about −80° C. to form the terminally functional polymer, wherein the monomer charge comprises isobutylene and the organic peroxy compound is charged in an amount of from about $10^{-4}$ to about $10^{-1}$ moles per mole of the isobutylene.

Further, in another of its aspects, the present invention provides a catalyst system suitable for use in living cationic polymerization which comprises an organic peroxy compound and a Lewis acid.

DETAILED DESCRIPTION OF THE INVENTION

The present invention provides a Process for the production of a terminally functional polymer. In developing this process we have discovered a novel catalyst system which can be used to conduct living polymerization. The term "living polymerization" as used herein is defined as a polymerization which is theoretically termination less and is not susceptible to chain transfer.

Specifically, we provide a catalyst system which comprises (i) a Lewis acid and (ii) an organic peroxy compound.

A number of Lewis acids are suitable for use in the process disclosed herein. Non-limiting examples include $BCl_3$, $BF_3$, $AlCl_3$, $SnCl_4$, $TiCl_4$, $SbF_5$, $SeCl_3$, $ZnCl_2$, $FeCl_3$ and $VCl_4$. The preferred Lewis acids for use in the present invention are $BCl_3$ and $TiCl_4$.

Generally, the organic peroxy compound suitable for use in the process disclosed herein may be selected from the group comprising organic peroxides and hydroperoxides, peroxy carbonates, azo peroxy compounds and peroxy esters.

Illustrative non-limiting examples of suitable organic peroxides and hydroperoxides include 1,1,3,3-tetramethylbutyl hydroperoxide; t-butyl hydroperoxide; cumene hydroperoxide; 2,5-dimethyl-,5-di(t-butylperoxy)-hexane; di(t-butyl)peroxide; 2,5-dimethyl-2,5-di(t-butylperoxy)hexyne-3; benzoyl peroxide; t-butyl cumyl peroxide; di(cumyl peroxide); t-amyl hydroperoxide; 2,5-di(hydroperoxy)-2,5-dimethylhexane; 3,3-dimethyl-2-methylhydroperoxybutene-1; 2,7-di(hydroperoxy)-2,7-dimethyloctane; diphenylhydroperoxymethane; benzyl hydroperoxide; p-methylhydroperoxytoluene; p-dicumyl dihydroperoxide; 1-isopropyl-3,5-dicumyl dihydroperoxide; cumylmethyl peroxide; triphenyl methyl hydroperoxide and bis-(m-2-hydroperoxy-2-propyl-α-cumyl) peroxide. Non-limiting examples of suitable peroxy carbonates include o,o-t-butyl-o-isopropyl-monoperoxycarbonate and o,o-t-butyl-o-(2-ethylhexyl)-monoperoxycarbonate. A non-limiting example of a suitable azo peroxy compound is t-butylperoxy-4-t-butylazo-4-cyanovalerate. Non-limiting examples of suitable peroxy esters include α-cumylperoxypivalate and α-cumylperoxy-neoheptanoate.

Preferably, the organic peroxy compound for use in the process described herein is selected from the group comprising t-butyl hydroperoxide, cumene hydroperoxide; p-dicumyl dihydroperoxide and triphenyl methyl hydroperoxide. Most preferably, the organic peroxy compound is selected from one of cumene hydroperoxide and p-dicumyl dihydroperoxide.

The amount of Lewis acid used relative to the amount of peroxy compound is not particularly critical. However, in order to be able to achieve more readily a polymer of desired molecular weight, it is preferred that the mole amount of Lewis acid used is equal to or greater than the mole amount of peroxy compound used. Generally, it is preferred to use from about 2 to about 50, most preferably from about 3 to about 40, moles of lewis acid per mole of peroxy compound. The concentration of peroxy compound used depends upon the molecular weight desired in the resultant polymer as hereinafter described and is within the range of from about $10^{-4}$ to about $10^{-1}$ moles per mole of monomer except where incremental addition of monomer is used when the ratio of peroxy compound to monomer is still applicable for the initial monomer concentration.

The monomer charge suitable for use in the process of the present invention comprises isobutylene. In a preferred embodiment, the monomer charge in addition to comprising isobutylene, may further comprise a $C_4$ to $C_8$ conjugated diolefin, the amount of such conjugated diolefin being up to about 50 mole percent of the total monomer charge and preferably up to about 10 mole percent of the total monomer charge. In another preferred embodiment, the monomer charge in addition to comprising isobutylene, may further comprise a $C_8$ to $C_{20}$ vinylidene aromatic monomer, in an amount up to about 20 mole percent of the total monomer charge. In yet another preferred embodiment, the monomer charge comprises isobutylene, a $C_4$ to $C_8$ conjugated diolefin and a $C_8$ to $C_{20}$ vinylidene aromatic monomer. The preferred conjugated diolefin is isoprene. The vinylidene aromatic monomer may be substituted or unsubstituted. The preferred vinylidene aromatic monomer is selected from the group comprising styrene, α-methyl styrene and p-methyl styrene.

Copolymers of isobutylene and a small amount of isoprene are commercially known as butyl rubbers. These copolymers are typically produced by polymerization at temperatures as low as $-100°$ C. in the presence of an aluminum chloride catalyst (e.g. $AlCl_3$). A disadvantage of this commercial process is the cost associated with conducting a commercial scale reaction at such low temperatures in a continuous manner. In some instances the refrigeration costs alone may amount to half of the total operating costs of running a commercial plant which produces butyl rubber.

The process described herein is capable of being used at a temperature of from about $0°$ to about $-80°$ C., preferably from about $0°$ to about $-50°$ C. Thus a terminally functionalized analog of butyl rubber may be produced in accordance with the process described herein at temperatures which would substantially reduce the refrigeration costs associated with the operation of a conventional, commercial butyl rubber plant.

The process according to the present invention may be conducted in the presence or absence of a diluent. Preferably, the process is conducted in the presence of a diluent. Preferred diluents include (i) $C_1$ to $C_4$ halogenated hydrocarbons, most preferably selected from methyl chloride ($CH_3Cl$) and methylene chloride ($CH_2Cl_2$), (ii) $C_5$ to $C_8$ aliphatic hydrocarbons, most preferably selected from the group comprising Pentane, hexane and heptane, and (iii) $C_5$ to $C_{10}$ cyclic hydrocarbons, most preferably cyclohexane, or mixtures of such halogenated hydrocarbons or mixture of such a halogenated hydrocarbon and such an aliphatic hydrocarbon.

The order of addition of the peroxy compound, lewis acid, diluent (if present) and monomer charge is not particularly critical. In a preferred embodiment, the components are added in the following order: diluent (if Present), monomer charge, peroxy compound, and Lewis acid.

Although not essential, it is preferred to agitate the reaction during the polymerization process. Such agitation can be achieved using conventional mixing means and serves to (i) create a homogeneous mixture of reactants and (ii) to dissipate the exothermic heat of reaction.

The terminally functional polymers produced in the presence of a diluent according to the process disclosed herein may be recovered by conventional techniques used to recover rubbery polymers. Such techniques include, for the higher molecular weight polymers, contacting the polymer-diluent solution or slurry with copious amounts of hot water thereby flashing off the diluent and any unreacted monomer. The polymer-hot water slurry may then be passed over a screen or filter to recover the polymer which may be passed through a tunnel dryer or drying extruder. In another such technique, especially for polymers produced in the presence of a diluent and having a number average molecular weight (Mn) of less than about 30,000, the polymer is recovered by (i) contacting the polymer-diluent solution or slurry with steam or by applying a vacuum to the polymer-diluent solution or slurry to flash off the diluent and any unreacted monomer; (ii) extracting acidic impurities and any remaining high boiling diluents with methanol; and (iii) drying the purified polymer to remove traces of methanol. In yet another technique, especially for low molecular weight polymers, the polymer-diluent solution is contacted with excess water to remove inorganic residues, the solution is dried and the diluent is then removed, as by evaporation.

The products produced according to the process described herein are halogen terminated polymers. While not wishing to be bound by any particular theory we believe that the polymerization mechanism associated with the process disclosed herein involves the opening of the bond between the alkyl group and oxygen of the peroxy compound, subsequently followed by monomer (in this case isobutylene) insertion. Specifically, the reaction most probably occurs according to the following illustrative equation:

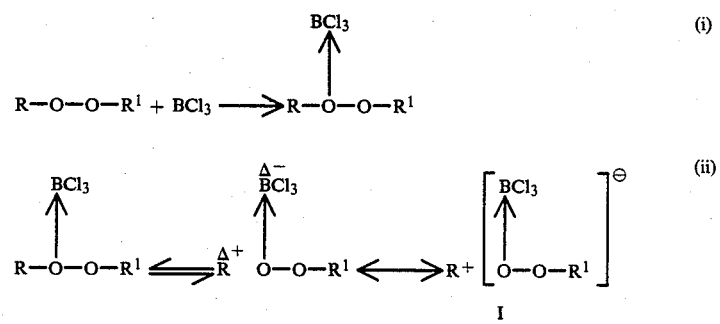

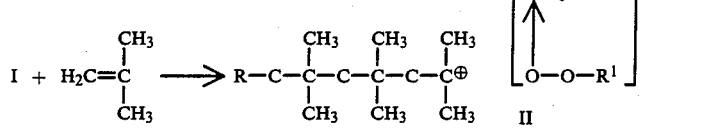

wherein R and R¹ may be the same or different, and may be aromatic or aliphatic, or R¹ may be hydrogen. Although the reaction which occurs during the process of the present invention is believed to be an essentially living polymerization, and thus theoretically termination less, termination of the reaction can be achieved by the addition of a strong nucleophilic compound or simply by raising the process temperature. Termination of the reaction is believed to occur according to the following illustrative equation:

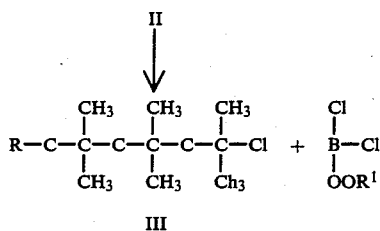

In this specific example, the product III is a chlorine terminated polymer of isobutylene. The by-product BCl₂(OOR¹) is converted to other products and may be removed during the recovery of the polymer.

In the case of copolymerization, for example of isobutylene and isoprene, in accordance with the process disclosed herein, the product would be a halogen, preferably chlorine, terminated polymer similar to the one illustrated above with the proviso that a small number of reacted isoprene units would be randomly distributed throughout the polyisobutylene backbone.

The molecular weight (i.e. the number average molecular weight $M_n$) of the polymer produced in the present process may be varied from as low as about 500 to as high as one million or more. Desireably, $M_n$ is from about 1000 to about 750,000. The molecular weight may be controlled by the ratio of the initial monomer concentration to the initial peroxy compound concentration. However, once the polymer has initially been produced, it is also possible to add further monomer which will polymerize to yield a higher molecular weight polymer.

The present invention will now be illustrated by the following non-limiting examples.

EXAMPLE 1

A series of pressure tube experiments were conducted by charging each tube with a specific amount of each of a diluent, initiator and monomer at a temperature of −30° C. The polymerization was initiated by the addition of pure Lewis acid co-catalyst, in this case TiCl₄. The polymerization was observed as being extremely rapid; that is, the reaction appeared to be over in a few minutes based on conversion calculations. To ensure that the polymerization was complete, the pressure tubes were left undisturbed for 30 minutes, after which the reaction was quenched by the addition of 5 mL of methanol (MeOH). The resultant polymers were recovered by successive evaporation of volatiles, dissolution in n-hexane, decantation or filtration of inorganic residues such as Lewis acid residues and removal of hexane by evaporation at room temperature. The resultant polymers were characterized by spectroscopic techniques such as IR, ultraviolet and ¹H NMR; osometry and GPC techniques were also used.

The polymerization reaction parameters and the physical properties of the resultant polymers are provided in Table 1. The results indicate that t-butyl hydroperoxide (t-BHP) is suitable as an initiator for the production of terminally functional polymers. After analyzing the product by ¹H NMR it was determined that the polymers contained the tert-butyl head group and the tert-chloro end group as shown by the following formula:

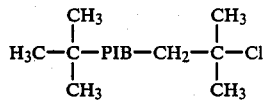

wherein PIB represents the polyisobutylene backbone.

TABLE 1

| Monomer = isobutylene (IB); 9.1 × 10⁻³ mole |
| Initiator = t-BHP; 1.28 × 10⁻⁴ mole |
| Lewis acid = TiCl₄; 1.37 × 10⁻³ mole |
| Diluent = CH₃Cl; 35 mL |

| Expt. # | conv. % | Mn | Mw | Mw/Mn |
|---|---|---|---|---|
| 1 | ~100 | 3000 | 13300 | 4.4 |
| 2 | ~100 | 3100 | 12800 | 4.1 |

EXAMPLE 2

Using the same experimental procedure as outlined in Example 1, another series of experiments was conducted using cumene hydroperoxide (CHP) as the initiator. The polymerization temperature was varied from −30° to −50° C. The polymerization parameters and physical properties of the resultant polymers are provided in Table 2.

TABLE 2

| Expt. # | CH₃Cl mL | Hexane mL | IB mole × 10² | CHP mole × 10⁵ | TiCl₄ mole × 10⁴ | Temp −°C. | Conv % | Mn (GPC) | Mw/Mn |
|---|---|---|---|---|---|---|---|---|---|
| 1 | 50 | — | 7.05 | 178.5 | 45.5 | 45 | 92 | 1900 | 1.8 |
| 2 | 500 | — | 8.9 | 178.5 | 346.5 | 50 | 100 | 2500 | 2.5 |
| 3 | 35 | 15 | 3.6 | 8.5 | 27.35 | 50 | 92 | 22325 | 2.8 |
| 4 | 35 | 15 | 3.6 | 4.2 | 27.35 | 50 | 98 | 37000 | 2.7 |

TABLE 2-continued

| Expt. # | CH$_3$Cl mL | Hexane mL | IB mole × 10$^2$ | CHP mole × 10$^5$ | TiCl$_4$ mole × 10$^4$ | Temp −°C. | Conv % | Mn (GPC) | Mw/Mn |
|---|---|---|---|---|---|---|---|---|---|
| 5 | 25 | 25 | 1.85 | 4.2 | 18.2 | 50 | 99 | 29625 | 3.3 |
| 6 | 25 | 25 | 3.65 | 4.2 | 18.2 | 50 | 96 | 42275 | 3.6 |
| 7 | 35 | — | 1.01 | 12.6 | 9.1 | 30 | 82 | 3250 | 1.6 |

The results indicate that cumene hydroperoxide is a suitable initiator for the production of terminally functionalized polymers. The molecular weight of the polymer is approximately given by the expression $$(M_o/I_o) \times IB_M$$

where Mo is the initial concentration of monomer, Io is the initial concentration of peroxy compound and $IB_M$ is the molecular weight of the monomer.

Using suitable analytical techniques the product was determined to be the following:

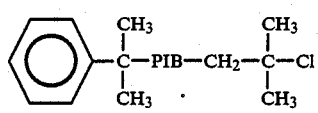

wherein PIB represents the polyisobutylene backbone.

EXAMPLE 3

Using the same experimental procedure as outline in Example 1 another series of experiments was conducted at −30° C. at various monomer concentrations and in a mixed diluent system. The initiator used was cumene hydroperoxide (CHP). The polymerization conditions and physical properties of the resulting polymers are provided in Table 3.

TABLE 3

Monomer = isobutylene (IB); as stated, mole
Initiator = CHP; 4.5 × 10$^{-5}$ mole
Lewis acid = TiCl$_4$; 2.1 × 10$^{-4}$ mole
Diluent = CH$_3$Cl and Hexane mixture;
35 mL: 25 mL CH$_3$Cl + 10 mL Hexane

| Expt. # | IB, g | IB, mole × 10$^2$ | conv. % | Mn | Mw/Mn | DP$_n$ × 10$^{-2}$ (calc'd) |
|---|---|---|---|---|---|---|
| 1 | 0.66 | 1.18 | ~100 | 13535 | 3.57 | 2.41 |
| 2 | 1.05 | 1.87 | ~100 | 18600 | 3.70 | 3.32 |
| 3 | 1.58 | 2.82 | ~100 | 40750 | 2.50 | 7.27 |
| 4 | 2.54 | 4.53 | ~100 | 54675 | 2.60 | 9.76 |

The number average degree of polymerization (DP$_n$) was calculated, for each experiment, according to the following equation:

DP$_n$ = Mn of polymer/molecular weight of isobutylene

A plot of 1/DP$_n$ vs. 1/[M$_o$], which is also known as a "Mayo plot", was constructed using the data in Table 3. The plot yielded a straight line going through the origin which illustrates that the polymerization reaction is essentially a living polymerization.

EXAMPLE 4

To further illustrate the living nature of the polymerization process disclosed herein, a series of polymerization experiments were conducted wherein additional quantities of monomer were added incrementally to reactions which already contained polymer.

Specifically, the experiments were conducted in a series of pressure tubes, each of which were charged, successively, with 35 mL CH$_3$Cl, cumene hydroperoxide (CHP; 1.6×10$^{-4}$ mole) and about 0.5 isobutylene (IB). The charged tubes were then allowed to thermoequilibrate at a temperature of −30° C. Polymerization was initiated by introducing 5.5×10$^{-3}$ mole of liquid BCl$_3$ into each of the test tubes. After 45 minutes reaction time, the reaction in the first of the test tubes (Experiment #1) was quenched by the addition of 5 mL of prechilled methanol. An additional amount of about 0.5 IB was charged into each of the remaining tubes. After 45 minutes, the reaction in the second tube (Experiment #2) was quenched by the addition of methanol. An additional amount of about 0.5 g IB was charged into each of the remaining tubes (i.e. Experiments #3, #4, #5 and #6; 1.17 g IB was inadvertently added to Experiment #3). This type of experimentation is sometimes referred to as "incremental polymerization".

This procedure was repeated until the polymerization reaction in each of the pressure tubes had been quenched. After conventional workup, the amount of polymer and its molecular weight and molecular weight distribution were determined. These data are given in Table 4. A plot of the Mn of the polymer vs. the weight of polymer produced yielded a straight line passing through the origin which is indicative of living polymerization having occurred.

TABLE 4

| Expt. # | IB added, g | Mn | Mw/Mn | Polymer formed, g |
|---|---|---|---|---|
| 1 | 0.53 | 5850 | 4.0 | 0.47 |
| 2 | 0.49 + 0.52 | 8650 | 2.7 | 0.85 |
| 3 | 0.54 + 0.41 + 1.17 | 12225 | 2.9 | 1.23 |
| 4 | 0.55 + 0.47 + 0.62 + 0.46 | 12575 | 2.6 | 1.41 |
| 5 | 0.60 + 0.62 + 0.53 + 0.55 + 0.53 | 15150 | 2.4 | 1.71 |
| 6 | 0.54 + 0.55 + 0.47 + 0.48 + 0.61 + 0.59 | 16750 | 2.5 | 1.70 |

EXAMPLE 5

A series of experiments similar to the one described in Example 4 was conducted using a mixed diluent system and TiCl$_4$ as the co-initiator. The reactions 4 al were allowed to proceed for 30 minutes between increment additions of isobutylene. The reaction parameters and Physical properties of the polymers produced are provided in Table 5. A plot of the Mn of the polymer produced vs. the weight of polymer produced yielded a straight line passing through the origin which is indicative that the polymerization process conducted in this example is living in nature.

TABLE 5

Monomer = isobutylene (IB)
Initiator = CHP; $4.5 \times 10^{-5}$ mole
Lewis acid = TiCl$_4$; $2.1 \times 10^{-4}$ mole
Diluent = CH$_3$Cl and Hexane mixture;
35 mL: 25 mL CH$_3$Cl + 10 mL Hexane

| Expt. # | IB added, g | Mn | Mw/Mn | Polymer formed, g |
|---|---|---|---|---|
| 1 | 1.07 | 12000 | 3.10 | 0.61 |
| 2 | 0.55 + 0.66 | 17950 | 2.98 | 1.01 |
| 3 | 0.48 + 0.60 + 0.60 | 26700 | 2.19 | 1.38 |
| 4 | 0.54 + 0.53 + 0.44 + 0.56 | 28875 | 2.17 | 1.49 |
| 5 | 0.54 + 0.54 + 0.57 + 0.55 + 0.55 | 36950 | 2.16 | 1.77 | omer selected from the group comprising α-methyl styrene (α-MS), p-methyl styrene (p-MS) and styrene (S).

Specifically, a reactor was charged with CH$_3$Cl, a specific amount of isobutylene, isoprene, styrenic monomer and CHP, at a temperature of −80° C. The terpolymerization were initiated by the addition of pure TiCl$_4$ and allowed to proceed with vigorous mixing at −80° C. for 30 minutes. The reactions were then quenched by the addition of prechilled methanol, The polymers were recovered in a manner similar to that described in Example 1. Details, including polymer compositions determined by $^1$H NMR, are given in Table 7.

TABLE 7

Monomers = isobutylene (IB); 7.91 mole
= isoprene (IP); 2.37 mole
= styrenic monomer; 0.79 mole
Initiator = CHP; $5.6 \times 10^{-3}$ mole
Lewis acid = TiCl$_4$; $2.0 \times 10^{-2}$ mole
Diluent = CH$_3$Cl; 2600 g

| Expt. # | Mole % in the Feed | | | | | Conv. % | Mole % in the Product | | | | |
|---|---|---|---|---|---|---|---|---|---|---|---|
|  | IB | IP | α-ms | p-MS | S |  | IB | IP | α-ms | p-MS | S |
| 1 | 77.6 | 14.7 | 7.7 | — | — | 100 | 92.1 | 1.0 | 6.9 | — | — |
| 2 | 77.6 | 14.7 | — | 7.7 | — | 100 | 91.6 | 1.1 | — | 7.7 | — |
| 3 | 77.6 | 14.7 | — | — | 7.7 | 100 | 87.0 | 1.0 | — | — | 12.0 |

EXAMPLE 6

In this Example, a series of experiments were conducted to produce terminally functionalized copolymers of isobutylene and isoprene. A series of pressure tubes were charged each with 25 mL of CH$_3$Cl or CH$_2$Cl$_2$ (as indicated), a specific amount of isobutylene and isoprene, and cumene hydroperoxide (CHP), at a temperature of −40° C. The copolymerizations were initiated by the addition of pure TiCl$_4$ and were allowed to proceed at −40° C. for 40 minutes with agitation of the pressure tubes. The reactions were then quenched by the addition of 5 mL of prechilled methanol. The product polymers were recovered in a manner similar to that described in Example 1. Characterization of the polymers was as hereinbefore described.

The polymerization reaction parameters and the properties of the polymers are provided in Table 6. The results indicate that CHP is suitable for use as an initiator in the production of terminally functional copolymers of isobutylene and isoprene.

TABLE 6

Monomer = isobutylene; M1 = $1.8 \times 10^{-2}$ mole
= isoprene; M2 = as stated, mole
Initiator = CHP; $2.1 \times 10^{-4}$ mole
Lewis acid = TiCl$_4$; $1.8 \times 10^{-3}$ mole
Diluent = CH$_3$Cl for Expt. 1, 2 and 3 (25 mL)
CH$_2$Cl$_2$ for Expt. 4, 5, 6 and 7 (25 mL)

| Expt. # | M2, × 10$^4$ | M2 in feed mole % | conv., % | Mn | Mw/Mn | isoprene in the polymer mole % |
|---|---|---|---|---|---|---|
| 1 | 10.25 | 5.85 | 94 | 2500 | 2.1 | 4.0 |
| 2 | 20.5 | 11.88 | 94 | 1925 | 2.1 | 7.3 |
| 3 | 41.0 | 22.16 | 100 | 1625 | 2.1 | 13.4 |
| 4 | 4.5 | 2.35 | 92 | 3125 | 2.4 | 1.7 |
| 5 | 10.25 | 5.54 | 95 | 2450 | 2.4 | 3.9 |
| 6 | 20.5 | 11.38 | 95 | 2000 | 2.4 | 6.3 |
| 7 | 41.0 | 22.16 | 100 | 1850 | 2.5 | 10.7 |

EXAMPLE 7

In this example, experiments were conducted to synthesize copolymers of isobutylene, isoprene and a monomer selected from the group comprising α-methyl styrene (α-MS), p-methyl styrene (p-MS) and styrene (S).

What is claimed is

1. A living cationic polymerization process for producing a terminally functional polymer which comprises introducing into a suitable reaction vessel a monomer charge, an organic peroxy compound and a Lewis acid, said Lewis acid being introduced last, and polymerizing the monomer charge at a temperature of from about 0° to about −80° C. to form said terminally functional polymer, wherein said monomer charge comprises isobutylene and said organic peroxy compound is charged in an amount of from $10^{-4}$ to about $10^{-1}$ moles per mole of said isobutylene.

2. The process of claim 1, wherein said monomer charge is polymerized at a temperature of from about 0° to about −50° C.

3. The process of claim 1, wherein said organic peroxy compound is selected from the group consisting of organic peroxide, organic hydroperoxide, peroxy carbonate, azo peroxy compound and peroxy esters.

4. The process of claim 3, wherein said organic peroxy compounds is a peroxide or a hydroperoxide selected from the group consisting of 1,1,3,3-tetramethylbutyl hydroperoxide, t-butyl hydroperoxide, cumene hydroperoxide, 2,5-dimethyl-2,5-di(t-butylperoxy)hexane, di(t-butyl) peroxide, t-butyl cumyl peroxide, di(cumyl peroxide), t-amyl hydroperoxide, 2,5-di(hydroperoxy)-2,5-dimethylhexane, 3,3-dimethyl-2-methylhydroperoxybutene-1,2,7-di(hydroperoxy)-2,7-dimethyloctane, diphenylhydroperoxymethane, benzyl hydroperoxide, p-methylhydroperoxytoluen,, p-dicumyl dihydroperoxide, 1-isopropyl-3,5-dicumyl dihydroperoxide, cumylmethyl peroxide, triphenyl methyl hydroperoxide and bis-(m-2-hydroperoxy-2-propyl-α-cumyl) peroxide.

5. The process of claim 3, wherein said organic peroxy compound is a peroxy carbonate selected from the group consisting of o,o-t-butyl-o-isopropyl-monoperoxycarbonate and o,o-t-butyl-o-(2-ethylhexyl)-monoperoxycarbonate.

6. The process of claim 3, wherein said organic peroxy compound is the azo peroxy compound t-butyl-peroxy-4-t-butylazo-4-cyanovalerate.

7. The process of claim 3, wherein said organic peroxy compound is a peroxy ester selected from the group consisting of α-cumylperoxy-pivalate and α-cumyl-peroxyneoheptanoate.

8. The process of claim 1, wherein said organic peroxy compound is selected from the group consisting of t-butyl hydroperoxide, cumene hydroperoxide, p-dicumyl dihydroperoxide and triphenyl methyl hydroperoxide.

9. The process of claim 1, wherein said organic peroxy compound is selected from cumene hydroperoxide and t-butyl hydroperoxide.

10. The process of claim 1, wherein said monomer charge further comprises a $C_4$ to $C_8$ conjugated diolefin.

11. The process of claim 10, wherein said monomer charge comprises up to about 50 mole percent of said conjugated diolefin.

12. The process of claim 11, wherein said conjugated diolefin is isoprene.

13. The process of claim 1, wherein said monomer charge further comprises a $C_8$ to $C_{20}$ vinylidene aromatic monomer in an amount of up to about 20 mole % of the monomer charge.

14. The process of claim 13, wherein said vinylidene aromatic monomer is selected from the group consisting of α-methyl styrene, p-methyl styrene and styrene.

15. The process of claim 1, wherein said monomer charge comprises isobutylene, a $C_4$ to $C_8$ conjugated diolefin and a $C_8$ to $C_{20}$ vinylidene aromatic monomer.

16. The process of claim 15, wherein said conjugated diolefin is isoprene and said vinylidene aromatic monomer is selected from the group consisting of α-methyl styrene, p-methyl styrene and styrene.

17. The process of claim 1, wherein said Lewis acid is selected from the group consisting of $BCl_3$, $BF_3$, $AlCl_3$, $SnCl_4$, $TiCl_4$, $SbF_5$, $SeCl_3$, $ZnCl_2$, $FeCl_3$ and $VCl_4$.

18. The process of claim 1, wherein said Lewis acid is selected from $BCl_3$ and $TiCl_4$.

19. The process of claim 1 conducted in the presence of a diluent.

20. The process of claim 19 wherein said diluent is selected from the group consisting of $C_1$ to $C_4$ halogenated hydrocarbons, $C_5$ to $C_8$ aliphatic hydrocarbons, $C_5$ to $C_{10}$ cyclic hydrocarbons, mixtures of said halogenated hydrocarbons, and mixtures of one of said halogenated hydrocarbons and one of said aliphatic hydrocarbons.

21. The process of claim 19, wherein said diluent is selected from methyl chloride, methylene chloride and mixtures thereof.

22. The process of claim 1 wherein said monomer charge is a mixture of isobutylene and isoprene the amount of isoprene being up to 10 mole % of the total monomer charge, said Lewis acid is one of $BCl_3$ and $TiCl_4$, said peroxy compound is one of cumene hydroperoxide and t-butyl hydroperoxide, the amount of said Lewis acid being from about 3 to about 40 moles per mole of said peroxy compound and a diluent is present selected from the group consisting of methyl chloride, methylene chloride, pentane, hexane, heptane or mixtures thereof.

* * * * *